I. N. WHITAKER.
Corn Husker.
No. 17,466.
Patented June 2, 1857.
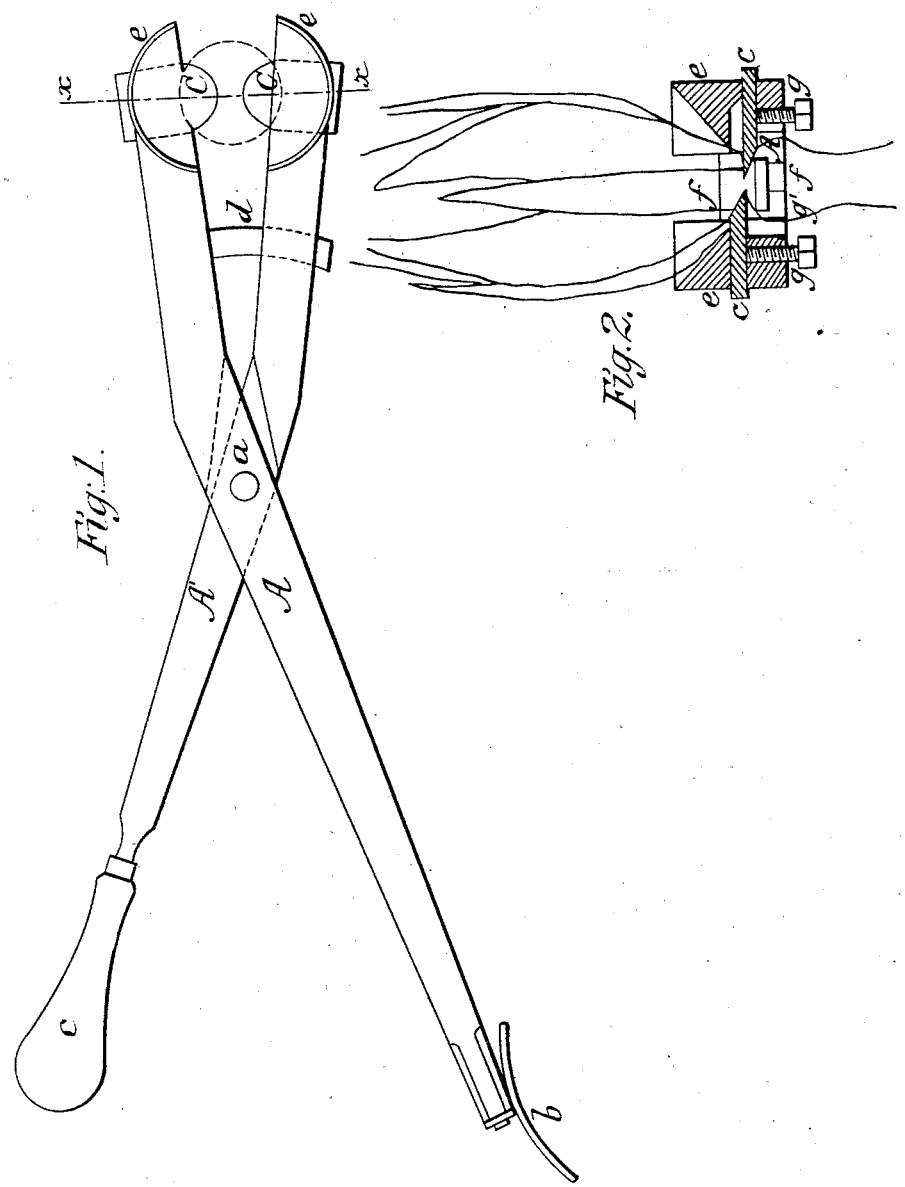

UNITED STATES PATENT OFFICE.

ISAAC N. WHITAKER, OF PECATONICA, ILLINOIS.

IMPROVED HAND IMPLEMENT FOR SEVERING THE BUTTS AND SEPARATING HUSKS FROM EARS OF CORN.

Specification forming part of Letters Patent No. 17,466, dated June 2, 1857.

*To all whom it may concern:*

Be it known that I, ISAAC N. WHITAKER, of Pecatonica, in the county of Winnebago and State of Illinois, have invented a new and useful Hand Implement for Husking Corn; and I do hereby declare that the following is a full, clear, and exact description of the same, reference being had to the accompanying drawings, making a part of this specification, in which—

Figure 1 is a plan or top view of my improvement. Fig. 2 is a transverse section of the same, the plane of section passing through the cutters and beveled or inclined jaws, as indicated by the line $x\ x$ in Fig. 1.

Similar letters of reference indicate the same parts in both figures.

My invention consists in having cutters attached to levers which cross each other and are connected by a fulcrum-pin, and also in having a concave and inclined or beveled flange or lip attached to each lever above its cutter, so that when the levers are closed the two flanges or lips will form an elliptical basin or cavity with the cutters at its bottom.

The implement is operated by the hand and husks the corn by cutting the butt or stem from the ear and at the same time forcing or pressing up the ear free from the husks, as will be hereinafter fully shown and described.

To enable those skilled in the art to make and use my invention, I will proceed to describe its construction and operation.

A A′ represent two levers which cross each other and work on a fulcrum-pin $a$, as shown in Fig. 1. A curved plate $b$ is attached to the end of the lever A, while a handle $c$ is attached to the end of the lever A′. The plate $b$ is attached to the lever A by a swivel-joint, and said plate has a strap attached to it for the purpose of securing the implement to the body, the strap (not shown) passing around the waist of the operator.

To the lever A and near its outer end a segment-guide $d$ is attached. This guide passes through a curved mortise in the lever A′. This guide causes the levers to work or open and close evenly and retains them in a proper relative position with each other, performing the function of an ordinary guide.

The outer end of each lever A A′ has a flange or lip $e$ upon it. The outer sides of these flanges or lips project at right angles from the levers; but the inner or face sides are beveled or inclined, as shown clearly in Fig. 2, and longitudinally they are of concave form, as shown in Fig. 1. The two flanges or lips when in contact form an elliptical cavity of taper form, the faces of the flanges or lips being nearer together at their bases than at their upper ends. This latter form of curve is owing to the curved or segment form of the flanges or lips.

To the outer end of each lever and at the base of its flange or lip $e$ a cutter C is attached. These cutters have semicircular cutting-edges, and one cutter works over the other, the basil $f$ of one cutter being at the upper side of the cutter and the basil of the other cutter being at the lower side, as shown clearly in Fig. 2.

The cutters C may be secured in the levers A A′ by means of the set-screws $g$, fitted in said levers, as shown clearly in Fig. 2.

The implement is used as follows: The plate $b$ is secured to the waist of the operator by means of a strap, as before stated, and as the plate $b$ is attached by a swivel to the lever A the implement may be secured to either side of the operator. The operator grasps the tip of the ear of corn with one hand and opens the levers A A′ by grasping the handle $c$, and the two cutters C C are placed at opposite sides of the butt or stem of the ear. The operator then closes the levers, and the cutters C C pierce the stem or butt and detach the ear from it, the husks being also detached from the stem or butt, and as the levers close the concave and oblique sides of the flanges or lips $e\ e$ press up the ear of corn and present it to the hand of the operator free from the husks. In Fig. 2 the ear and stem or butt are shown in red, the stem being nearly severed from the ear.

It will be understood that the husks of the ears of corn are not attached to the ears, but to the stems or butts, the husks merely encompassing the ears. Consequently when the butt or stem is cut from the ear and the husks are detached from the butt or stem the ear may be readily thrown out from the husks by the action of the ledges or flanges.

This implement has been practically tested and operates well. Much time will be saved by its use. It is preferable to those machines which are operated by power, for in the latter machines the ears are first plucked from the stalks, or if not plucked the stalks require to be carried to the machine and placed upon it, so that either the ears or stalks are handled twice. By my improvement the ears are detached from the stalks and husked at the same time.

The implement may be constructed at a small cost. It should be constructed wholly of metal, with the exception, perhaps, of the handle. The cutters are of course made of steel. The levers may be of iron.

Having thus described the nature and operation of my invention, what I claim as new, and desire to secure by Letters Patent, is—

The cutters C C and flanges or lips $e\ e$, attached to the levers A A' and constructed and arranged substantially as shown and described, for the purpose herein set forth.

I. N. WHITAKER.

Witnesses:
FREDERICK BROWN,
A. S. VAN DYKE.